(12) United States Patent
Weigel et al.

(10) Patent No.: US 8,547,558 B2
(45) Date of Patent: Oct. 1, 2013

(54) ALIGNING DEVICE FOR MEASURING MEANS IN A WIND POWER ROTOR

(75) Inventors: Michael Weigel, Wassenburg (DE); Joachim Tiedeke, Kreuzlingen (CH)

(73) Assignee: Baumer Innotec AG, Fraunfeld (CH)

( * ) Notice: Subject to any disclaimer, the term of this patent is extended or adjusted under 35 U.S.C. 154(b) by 133 days.

(21) Appl. No.: 13/296,504

(22) Filed: Nov. 15, 2011

(65) Prior Publication Data
US 2012/0120400 A1    May 17, 2012

(30) Foreign Application Priority Data
Nov. 16, 2010 (EP) .................. 10014653

(51) Int. Cl.
*G01B 11/14* (2006.01)
*F03B 15/06* (2006.01)

(52) U.S. Cl.
USPC .............. 356/614; 416/61; 415/4.3; 415/118

(58) Field of Classification Search
USPC ............... 356/614–623, 445–448, 138, 153; 416/11, 1, 120, 61; 415/118, 4.3, 14
See application file for complete search history.

(56) References Cited

U.S. PATENT DOCUMENTS

| | | | |
|---|---|---|---|
| 4,432,695 A * | 2/1984 | Voitsekhovsky et al. | 416/11 |
| 7,059,822 B2 * | 6/2006 | LeMieux et al. | 415/4.3 |
| 2010/0303624 A1 * | 12/2010 | Aderhold | 416/61 |
| 2011/0049886 A1 * | 3/2011 | Becker et al. | 290/44 |
| 2012/0002038 A1 * | 1/2012 | Furrer et al. | 348/129 |
| 2013/0093879 A1 * | 4/2013 | Bertolotti | 348/125 |

FOREIGN PATENT DOCUMENTS

| | | |
|---|---|---|
| DE | 10 2006 002708 A1 | 7/2007 |
| DE | 10 2006 002 708 B4 | 12/2007 |
| WO | 2009/143850 A2 | 12/2009 |
| WO | 2010/089139 A1 | 8/2010 |

\* cited by examiner

*Primary Examiner* — Hoa Pham
(74) *Attorney, Agent, or Firm* — McGlew and Tuttle, P.C.

(57) ABSTRACT

A wind power rotor with measuring device (3) for measuring rotor deflection. A measuring cavity (20), which has a transmitter/receiver (31/32) at one end and a reflector device (33) at the other end, extends in a longitudinal direction of the rotor. The transmitter/receiver (31/32) is accommodated in a housing (50), which is fastened to an intermediate plate (10) with three-point mounting (12, 13, 14).

20 Claims, 5 Drawing Sheets

ALIGNING DEVICE FOR MEASURING MEANS IN A WIND POWER ROTOR

CROSS REFERENCE TO RELATED APPLICATIONS

This application claims the benefit of priority under 35 U.S.C. §119 of European Patent Application EP 10014653.9 filed Nov. 16, 2010, the entire contents of which are incorporated herein by reference.

FIELD OF THE INVENTION

The present invention pertains to a wind power rotor with measuring means measuring the rotor deflection and comprises a hub with at least one rotor blade, a cavity for receiving the measuring means, with a measuring cavity, which extends in the longitudinal direction of the rotor blade, and an analyzing means. The measuring means has a light beam transmitter for transmitting at least one beam bundle in the longitudinal direction of the measuring cavity, a reflector means accommodated therein and at least one receiver for detecting reflected light.

BACKGROUND OF THE INVENTION

Such a rotor of a wind power plant is known from DE 10 2006 002 708 B4. The rotor blade is hollow and the reflection means are arranged at the outer wall or at the middle web of the rotor blade. A transmitting unit and a receiving unit are arranged in the rotor hub flush with the cavity and accommodated in a common housing. The fastening of this housing in the rotor hub is not shown.

To measure the rotor deflection, exact alignment is necessary between the transmitter/receiver and the reflector. When mounting the transmitter and receiver in the rotor, this means mounting surfaces machined with very high precision in the rotor. It is desirable that the useful measuring range of the receiver corresponds to the deflection range of the associated rotor blade. This would mean very high requirements in terms of tolerance during the manufacture of the hub, the rotor blade and the connection between hub and rotor blade and for the fastening of the housing of the measuring means.

SUMMARY OF THE INVENTION

A basic object of the present invention is to create an aligning means, with which convenient and yet accurate setting of the receiver to the deflection range of the rotor blades is possible in two degrees of freedom (zenith and azimuth angle) and the receiver can be fixed in the rotor hub rigidly and with low vibration despite the convenient setting, without imposing excessively high requirements on the rotor blade manufacturing tolerances.

To accomplish this object, a mounting or intermediate plate is used, which holds the receiver housing at three points. The housing is fastened specifically to the intermediate plate, which is in turn fastened in the hub or in the rotor blade, and has an aligning surface, which is located opposite the intermediate plate with an intermediate space. An adjusting means (adjusting/fixing means) with a plurality of distance setting means is provided. A distance setting means, which make it possible to set a local distance of the aligning surface from the intermediate plate, which permits the perpendicular of the aligning surface to be aligned in the longitudinal direction of the measuring cavity, is provided at at least three adjusting points of the intermediate space, which number is an ideal number. It shall be noted that the intermediate plate is fastened to the hub body, or the platform of the rotor blade or forms part of this hub body or rotor blade.

In a preferred embodiment, the aligning surface is part of a housing flange and the intermediate plate is provided with a cutout in order to receive the housing therein. Due to this design, the rear side of the housing is freely accessible, and it may have a vision window and various connections. This facilitates the checking of the alignment of the measuring means and guarantees easy access to the control connections.

According to one embodiment of the present invention, each distance setting means comprises a fastening stud, a compression spring and a lock screw, wherein said fastening stud passes through a passage hole of the intermediate plate and meshes with a screw hole of the housing via the intermediary of the compression spring. A screw head or a nut to tighten the stud is provided. The lock screw is seated adjacent to the passage hole in a screw hole of the intermediate plate and can be brought into contact with the aligning surface after adjusting the receiver housing. The rather stiff compression spring ensures a lack of clearance between the head or nut of the respective fastening stud and the intermediate plate, and the lock screw makes the adjusting means stiff and vibration-proof after the adjustment has been made.

The transmitter and receiver are preferably accommodated in a common housing. An extra adjustment of the transmitter can thus be eliminated.

In a preferred embodiment, the receiver contains at least one imaging optical system, which images the reflector means onto a detection plane or a sensor. When the reflector image deviates from its neutral position in case of deflection of the rotor blade, the analyzing unit interprets this as a bending of the rotor blade. When the deflection assumes, for example, dangerous extents, this can be detected by the analyzing means and move the wind power plant into the rest position.

The reflector means may have two or more retroreflectors at different distances from the transmitter and receiver. These retroreflectors are imaged at different locations of the detection plane of the receiver.

As a result, the actual deflection process can be better extrapolated. If reflector pairs are used at each measuring point instead of one reflector, the torsion can be additionally determined at this point.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
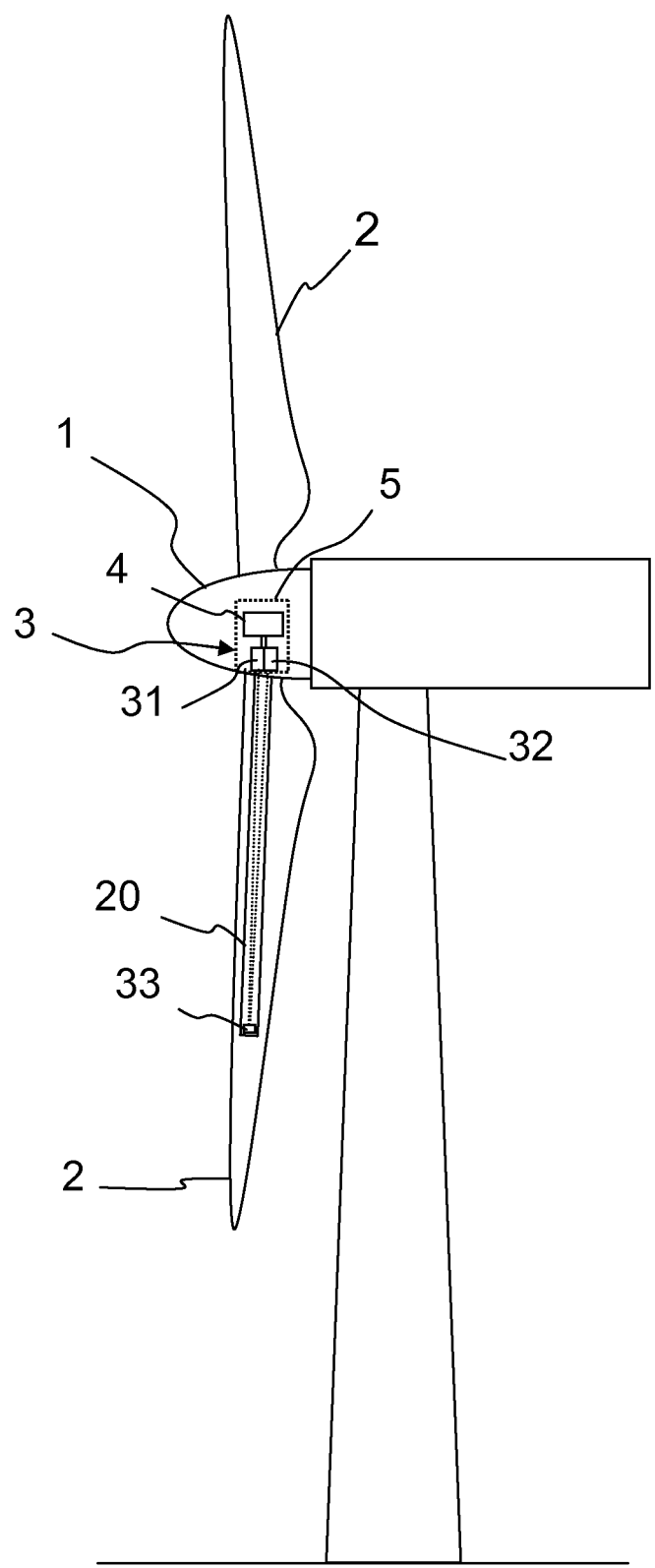
FIG. 1a is a schematic view showing a wind power plant with wind power rotor and measuring means of the rotor deflection in a first embodiment of the invention.

Referring to the drawings in particular, FIG. 1a shows a wind power plant with a hub 1 and rotor blades 2. The direction of the rotor axis is designated by X, the longitudinal extension of the rotor blade 2 by Z, and the tangent to the rotor circumference by Y. A measuring means 3 for the rotor deflection is arranged in a cavity 5 of hub 1, namely, flush with a cavity 20, which extends in the longitudinal direction of the rotor blade 2. The measuring means 3 comprises a transmitter 31 and a receiver 32, which are preferably accommodated in a common housing 50, and a reflector means 33, which is fixed in a measuring cavity 20 of the rotor blade. An analyzing means 4, which responds in case of excessive rotor deflections and actuates the braking of the wind power plant, is arranged next to the measuring means 3.

Figure 1B:
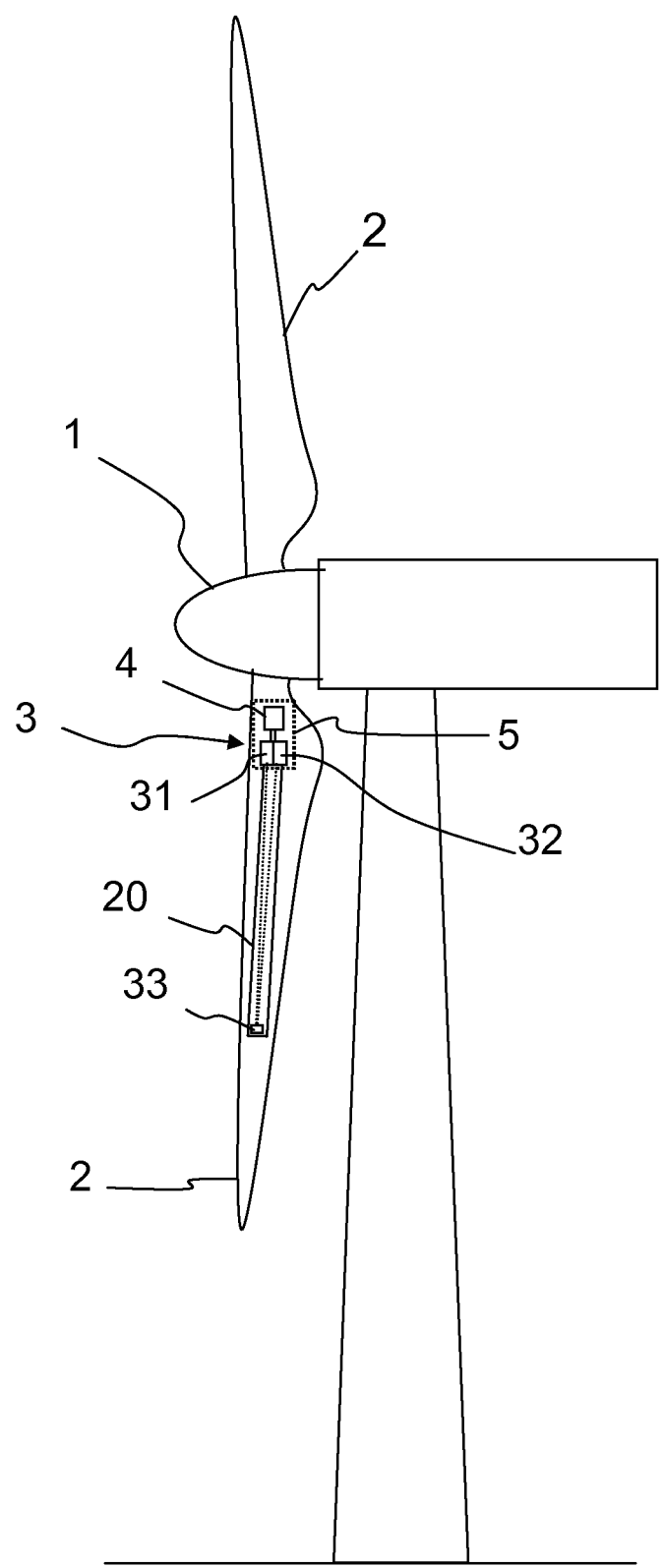
FIG. 1b is a schematic view showing a wind power plant according to a second embodiment of the invention.

In the embodiment of the wind power plant according to FIG. 1b, cavity 5 for accommodating the measuring means 3 and the housing 50 is accommodated in the rotor blade 2, which shall be monitored.

Figure 2:
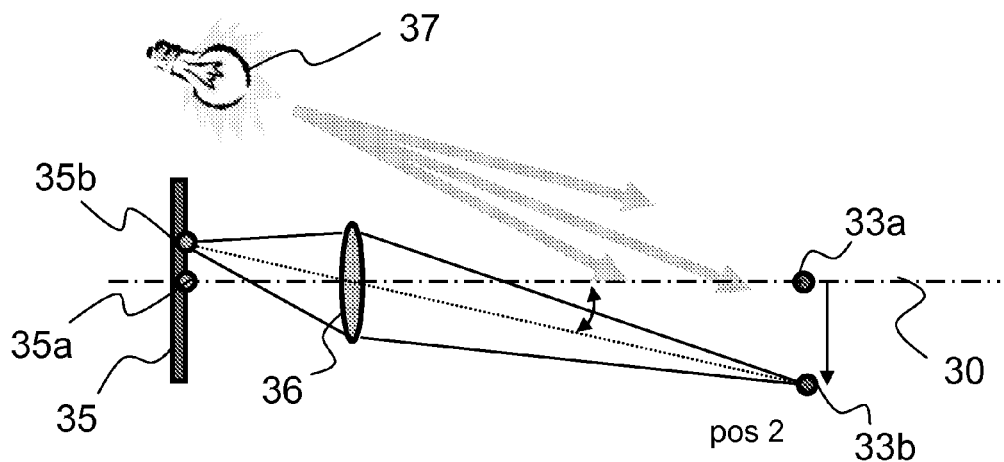
FIG. 2 is a schematic diagram of the measurement of the rotor deflection.

FIG. 2 is a schematic view of the measuring means 3. This comprises a sensor 35 arranged in the detection plane and an imaging optical system 36 for imaging the reflector 33 onto the sensor 35. Two positions of the reflector 33a and 33b are shown, which are imaged in the detection plane at 35a and 35b. Position 33a is located in the optical axis 30 and designates the neutral position of the rotor, whereas position 33b indicates a deflected position or deflection of the rotor. The area in which the reflector 33 is located is illuminated by a light source 37, which can emit visible light, but also another type of electromagnetic radiation.

Figure 3:
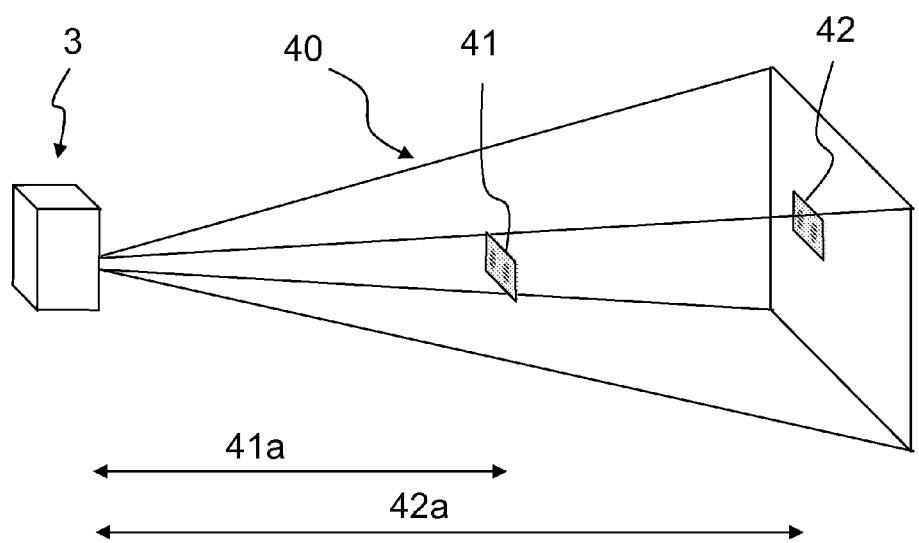
FIG. 3 is a view showing an arrangement of retroreflectors in a field of view of the measuring means.
Figure 4:
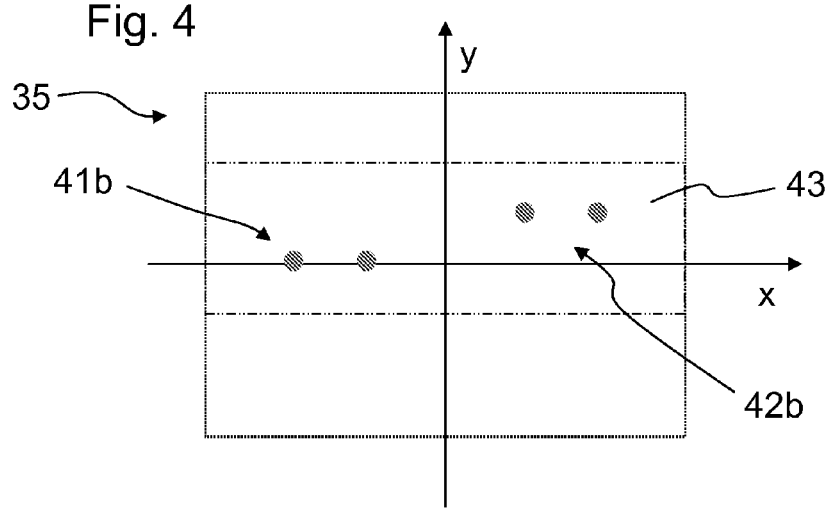
FIG. 4 is a view of the detection plane of the receiver of the measuring means.

FIG. 3 shows the useful field of view 40 of the measuring means 3, is not represented true to scale. Two retroreflectors 41 and 42 are arranged at spaced locations from the detection plane of the measuring means 3 as a reflector means. The detection plane or the sensor 35 is shown in a top view in FIG. 4. Images 41b and 42b of the deflections of the retroreflectors 41 and 42 are indicated in FIG. 4, as is image 43, within which the image of the retroreflector 41 is allowed to move in the permissible operating mode. The retroreflector pairs 41 and 42 make possible the measurement of the local torsion.

Figure 6:
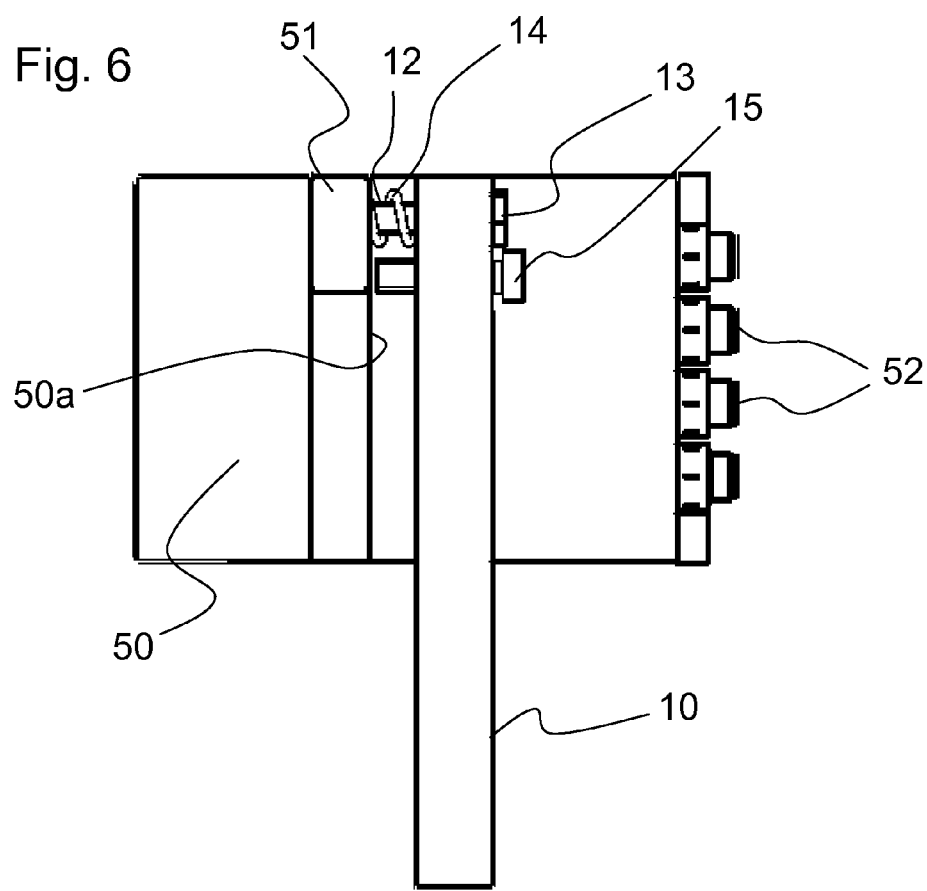
FIG. 6 is a side view of a housing and of the aligning means.
Figure 5:
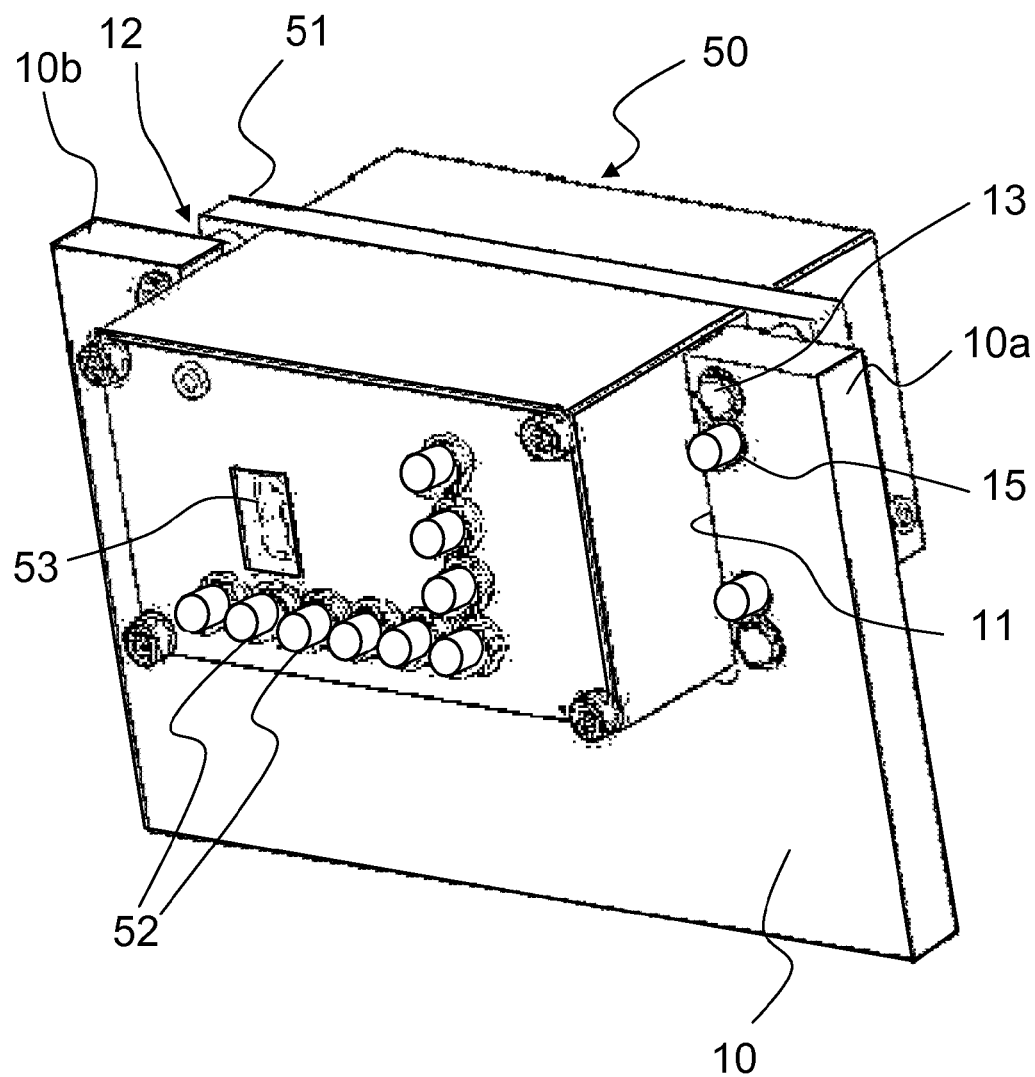
FIG. 5 is a perspective view of the housing of the measuring means in cooperation with an aligning means.

FIGS. 5 and 6 show the common housing 50 for the transmitter 31 and receiver 32, held at a mounting or intermediate plate 10. This intermediate plate 10 is fastened in the cavity, namely a surface at the hub body (FIG. 1a) or at a platform surface of the rotor blade (FIG. 1b). It is also possible that the intermediate plate 10 forms a part of the hub body or rotor blade. The intermediate plate 10 is U-shaped and comprises a cut-out 11, in which housing 50 is accommodated. Housing 50 may assume any desired shape, but it has a projecting flange 51, which extends in parallel to the intermediate plate 10 and is located opposite the two legs 10a, 10b of the U-shaped intermediate plate 10. The rear end of the housing 50 passes through the recess 11 and thus offers free access to a number of connections 52 as well as a window 53. An intermediate space 12, which is bridged over by an adjusting/fastening means, which holds the housing 50 at the intermediate plate 10, is located between housing flange 51 and intermediate plate 10.

The adjusting/fastening means comprise at least three studs 13 located at spaced locations from one another, where said number three is ideal, and the studs pass through associated holes in respective legs 10a, 10b of the intermediate plate 10 with some "clearance" and mesh with associated screw holes of the housing flange 51. The middle section of each stud 13 is surrounded by a compression spring 14, which is located in the intermediate space 12 and tightens the screw head (or the nut of a double-end stud) against the intermediate plate 10 and the screw threads of the stud 13 against the corresponding screw threads of the screw hole in flange 51. Absence of clearance is achieved in this manner in the fastening connection between housing 50 and the intermediate plate 10. By the stud 13 with head being screwed more or less into the housing flange 51, the width of the intermediate space 12 is changed because of the head being in contact with the rear side of the intermediate plate 10. The same effect is achieved by tightening the nut in case of a double-end stud. Since there are at least three studs located at spaced locations from one another, the angular orientation of the housing flange 51 relative to the plane of the intermediate plate 10 can be aligned. The position set is then made vibration-proof by tightening a lock screw 15 by eliminating any compliance from the screw connection between housing flange 51 and intermediate plate 10.

The rear side of the housing flange 51 can be considered to be an aligning surface 50a, at which the angular orientation of the housing 50 in relation to the mounting or intermediate plate 10 can be measured. The optical axis 30 is ideally the perpendicular to this aligning surface 50a.

It is apparent that the aligning surface 50a does not have to be formed on a flange surface by all means, and frame-like parts of the front or rear side of the housing 50 may be used as well.

The adjustment of housing 50 and hence the adjustment of the optical axis 30 of the receiver 3 to the reflector means 33 in the undeformed state of the rotor blade 2 is performed such that image 41b, 42b of the retroreflectors 41 and 42, respectively, is moved into a starting position within the sensor plane. If a deflection or bending of the rotor blade 2 occurs later, image 41b or 42b migrates to another location of the sensor plane, which is detected by sensor 35 and is reported to the analyzing means 4. When unacceptably high deflection values of the rotor blade are reached, the wind power plant is stopped in order to prevent damage to the rotor blades.

The studs 13, in cooperation of its head (or its nut) with the intermediate plate 10 and in cooperation of its barrel with the screw hole in the housing flange 51 as well as the compression spring 14 in cooperation with the components 10 and 51, form at the same time a fastening means and a spacing adjusting means, while the lock screw 15 represents more or less a securing means. The functions of fastening, distance setting (adjusting) and securing of the distance may also be assumed in another manner, distributed among fastening elements in order to embody a three-point fastening of the housing 50 at the intermediate plate 10. It is thus possible to use as the adjusting/fastening means a fastening screw with spherical end, which is held with the spherical end in the housing flange or in another part of the housing, while the barrel of the screw can be screwed into the intermediate plate to change the distance. The distance set is fixed now in a manner similar to what was described with a lock screw or another clamping means.

While specific embodiments of the invention have been shown and described in detail to illustrate the application of the principles of the invention, it will be understood that the invention may be embodied otherwise without departing from such principles.

What is claimed is:

1. A wind power rotor with a measuring means for measuring a rotor deflection, the wind power rotor comprising:
   a hub with at least one rotor blade, said hub with at least one rotor blade having a measuring means cavity and having a measuring cavity, which extends in a longitudinal direction of said rotor blade, said measuring means being at least partially received in said measuring means cavity, said measuring means including a light beam transmitter for transmitting at least one beam bundle in the longitudinal direction, at least one reflector means accommodated in said rotor blade and at least one receiver for detecting reflected light;
   an analyzing means;
   an intermediate plate in said measuring cavity;
   a housing connected to said intermediate plate in said measuring means cavity, said housing having an aligning surface, which is located opposite said intermediate plate, with intermediate space provided between said aligning surface and said intermediate plate, said receiver being accommodated in said housing; and
   adjusting means for providing an adjustment of a local distance of said aligning surface from said intermediate plate at least three points of the intermediate space.

2. A wind power rotor in accordance with claim 1, wherein said aligning surface is part of a housing flange and said intermediate plate is provided with a cut-out for receiving said housing.

3. A wind power rotor in accordance with claim 1, wherein:
   said adjusting means comprises a plurality of distance setting means for setting a distance;
   each of said distance setting means comprises a fastening stud, a compression spring and a lock screw;
   each said fastening stud passes through a hole of the intermediate plate and meshes with a screw hole of said housing via the intermediary of said compression spring; and
   a lock screw is seated in said screw hole of said intermediate plate and is brought into contact with said aligning surface after adjustment of said housing.

4. A wind power rotor in accordance with claim 1, wherein said housing accommodates said transmitter and said receiver.

5. A wind power rotor in accordance with claim 1, wherein:
   said receiver comprises at least one imaging optical system, which images a reflector image onto a sensor;
   a deviation of said reflector image from a neutral position provides an indication of a bending of said rotor blade.

6. A wind power rotor in accordance with claim 5, wherein said reflector means has two retroreflectors at different distances from said receiver, said retroreflectors being imaged at different points of said sensor.

7. A wind power rotor in accordance with claim 1, wherein said reflector means comprises a reflector pairs providing reflector images for measurement of a torsion of said rotor blade.

8. A wind power rotor comprising:
   a hub;
   a rotor blade connected to said hub, at least one of said hub and said rotor blade defining a measuring device cavity and said rotor blade defining a measuring cavity extending from said measuring device cavity in a longitudinal direction of said rotor blade;
   a measuring device for measuring a rotor deflection, at least a portion of said measuring device being received in said measuring device cavity, said measuring device including a transmitter and receiver for transmitting at least one radiation beam bundle in the longitudinal direction of said measuring cavity and for receiving reflected radiation and a reflector device accommodated in said measuring cavity;
   an analyzing device connected to said measuring device;
   an intermediate plate fixed to one of said hub and said rotor blade in said measuring cavity;
   a housing having an aligning surface located opposite said intermediate plate, with an intermediate space defined between said aligning surface and said intermediate plate, said receiver being accommodated in said housing; and
   an adjusting means for adjusting an optical axis of the receiver to the reflector device by setting a distance between said aligning surface and said intermediate plate in said measuring cavity.

9. A wind power rotor in accordance with claim 8, wherein said aligning surface is part of a housing flange fixed to said housing and said intermediate plate is provided with a cut-out for receiving said housing.

10. A wind power rotor in accordance with claim 8, wherein;
    said adjusting means comprises a plurality of distance setting devices;
    each of said distance setting devices comprises a fastening stud, a compression spring and a lock screw;
    each said fastening stud passes through a hole of the intermediate plate and meshes with a screw hole of said housing via the intermediary of said compression spring; and
    a lock screw is seated in said screw hole of said intermediate plate and is brought into contact with said aligning surface after adjustment of said housing.

11. A wind power rotor in accordance with claim 8, wherein said housing accommodates said transmitter and said receiver.

12. A wind power rotor in accordance with claim 8, wherein:
    said receiver comprises at least one imaging optical system, which images a reflector image onto a sensor;
    a deviation of said reflector image from a neutral position provides an indication of a bending of said rotor blade.

13. A wind power rotor in accordance with claim 12, wherein said reflector device has two retroreflectors at different distances from said receiver, said retroreflectors being imaged at different points of said sensor.

14. A wind power rotor in accordance with claim 8, wherein said reflector device comprises a reflector pairs providing reflector images for measurement of a torsion of said rotor blade.

15. A wind power rotor comprising:
    a hub;
    a rotor blade connected to said hub, at least one of said hub and said rotor blade defining a measuring device cavity and said rotor blade defining a measuring cavity extending from said measuring device cavity in a longitudinal direction of said rotor blade;
    a measuring device at least partially in said measuring device cavity, said measuring device including a transmitter and receiver for transmitting a beam bundle in said measuring cavity in the longitudinal direction and for receiving a reflection and a reflector device accommodated in said measuring cavity at a location spaced from said transmitter and receiver;
    an analyzing device connected to said measuring device;
    an intermediate plate fixed relative to said measuring cavity;

a receiver housing connected to said intermediate plate at three points, said housing having an aligning surface, which is located opposite said intermediate plate, with an intermediate space defined between said aligning surface and said intermediate plate, said receiver being accommodated in said housing; and a distance setting device at each of said three points, each distance setting device setting a distance of the aligning surface from the intermediate plate at one of said three points, whereby a perpendicular of the aligning surface is aligned relative to the reflector device in the longitudinal direction of the measuring cavity.

16. A wind power rotor in accordance with claim 15, wherein said aligning surface is part of a housing flange and said intermediate plate is provided with a cut-out for receiving said housing.

17. A wind power rotor in accordance with claim 15, wherein;

each distance setting device comprises a fastening stud, a compression spring and a lock screw;

each said fastening stud passes through a hole of the intermediate plate and meshes with a screw hole of said housing via the intermediary of said compression spring; and a lock screw is seated in said screw hole of said intermediate plate and is brought into contact with said aligning surface after adjustment of said housing.

18. A wind power rotor in accordance with claim 15, wherein:

said receiver comprises at least one imaging optical system, which images a reflector image onto a sensor;

a deviation of said reflector image from a neutral position provides an indication of a bending of said rotor blade.

19. A wind power rotor in accordance with claim 18, wherein said reflector device has two retroreflectors at different distances from said receiver, said retroreflectors being imaged at different points of said sensor.

20. A wind power rotor in accordance with claim 15, wherein said reflector device comprises a reflector pairs providing reflector images for measurement of a torsion of said rotor blade.

* * * * *